(12) United States Patent
Klier et al.

(10) Patent No.: US 9,335,068 B2
(45) Date of Patent: *May 10, 2016

(54) SYSTEM AND METHOD FOR TEMPERATURE LIMITING IN A SEALED SOLAR ENERGY COLLECTOR

(71) Applicant: TIGI LTD., Neve Yarak (IL)

(72) Inventors: Shimon Klier, Savyion (IL); Zvika Klier, Tel Aviv (IL); Michael Adel, Zichron Ya'akov (IL); Royi Efron, Ramat Gan (IL)

(73) Assignee: TIGI LTD., Petach Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/483,207

(22) Filed: Sep. 11, 2014

(65) Prior Publication Data
US 2015/0075517 A1    Mar. 19, 2015

Related U.S. Application Data

(63) Continuation of application No. 13/522,714, filed as application No. PCT/IB2011/050208 on Jan. 18, 2011, now Pat. No. 8,857,426.

(60) Provisional application No. 61/295,789, filed on Jan. 18, 2010.

(51) Int. Cl.
*F24J 2/32*    (2006.01)
*F24J 2/46*    (2006.01)
*F24J 2/44*    (2006.01)
*F24J 2/51*    (2006.01)

(52) U.S. Cl.
CPC .... *F24J 2/32* (2013.01); *F24J 2/44* (2013.01); *F24J 2/4625* (2013.01); *F24J 2/51* (2013.01); *Y02E 10/40* (2013.01)

(58) Field of Classification Search
CPC .................. F24J 2/32; F24J 2/44; F24J 2/51; F24J 2/4625; Y02E 10/40
See application file for complete search history.

(56) References Cited

U.S. PATENT DOCUMENTS 8,857,426 B2 * 10/2014 Klier et al. ............... 126/643

* cited by examiner

*Primary Examiner* — Alfred Basichas
(74) *Attorney, Agent, or Firm* — Mark M. Friedman (57) ABSTRACT

Insulated solar panels that provide a solar thermal collector with means for limiting stagnation temperatures and preventing damage include: temperature limiting is provided by the insulated solar panel, isolating internal components from the environment, using passive closed systems within the sealed solar thermal collector, while also allowing alternative implementations as active systems and/or portions of the temperature limiting system outside the sealed solar thermal collector. A heat pipe can be used as a passive thermal switch, where the temperature induced action at a predetermined temperature causes an abrupt transition from a state of thermal isolation to a state of strong thermal coupling. Additionally, a set of siphon circulation pipes provides a passive closed system for temperature limiting.

15 Claims, 7 Drawing Sheets

SYSTEM AND METHOD FOR TEMPERATURE LIMITING IN A SEALED SOLAR ENERGY COLLECTOR

FIELD OF THE INVENTION

The present embodiment generally relates to solar energy collectors, and in particular, the present embodiment concerns limiting the temperature inside a sealed solar energy collector.

BACKGROUND OF THE INVENTION

Figure 3:
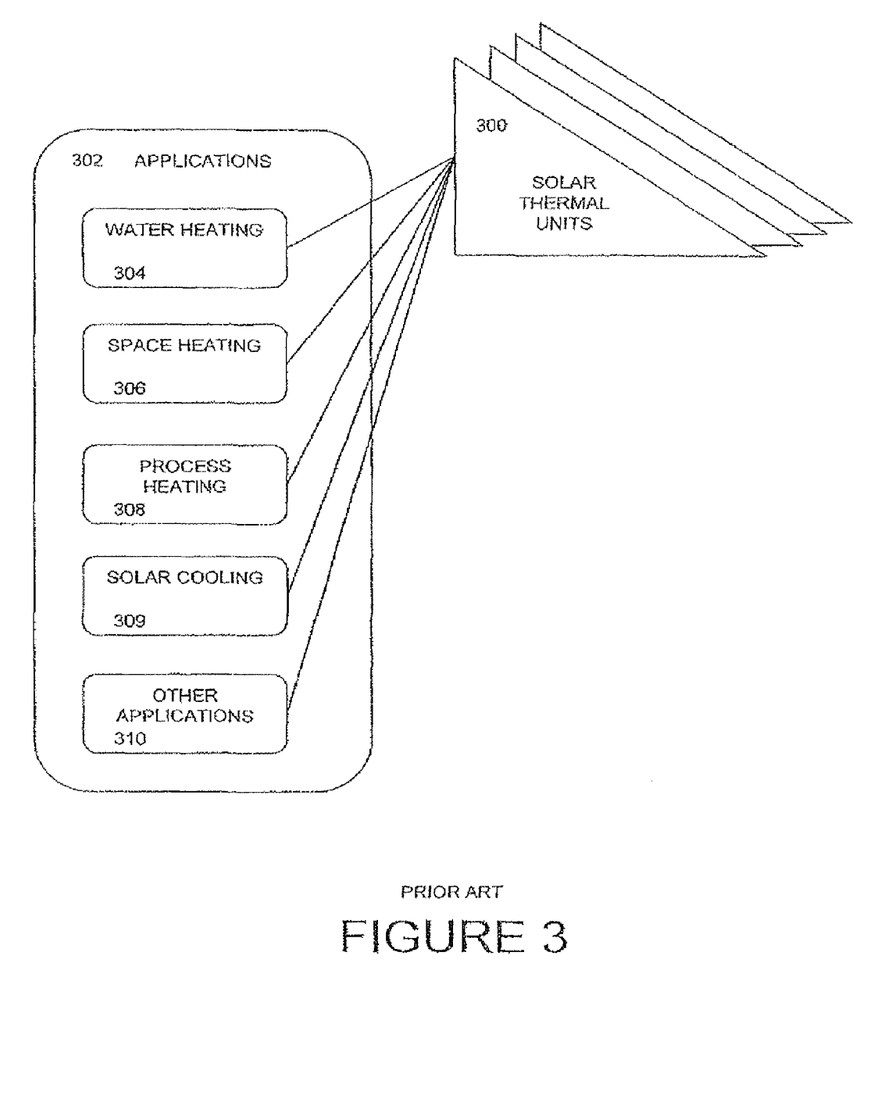
FIG. 3 is a diagram of a typical solar collecting system.

Referring to FIG. 3, a diagram of a typical solar collecting system, solar thermal units 300, also known as solar thermal collectors, solar energy collectors, solar panels, or solar modules, convert solar radiation to thermal energy for a variety of applications 302 within residential or industrial structures. Typical applications include water heating 304, space heating 306, industrial process heating 308, solar cooling 309, and other applications 310. A variety of solar thermal collectors are commercially available, and deployment, operation, and maintenance of conventional solar thermal collectors is well known in the industry. For clarity in this document, the singular term application is often used but does not imply limiting to a single application, and one ordinarily skilled in the art will understand that that multiple applications are included. In the context of this document, references to the term solar collecting system generally refer to one or more solar thermal collectors, application components, and related support components.

Thermally insulating panels transmissive to solar radiation, while having low transmissivity to thermal infra-red radiation, have been disclosed in U.S. Pat. Nos. 4,480,632, 4,719,902, 4,815,442, 4,928,665, and 5,167,217 all to Klier and Novik. The thermally insulating panel, also called transparent insulation material or thermal diode, may be a honeycomb made of synthetic material or a honeycomb made of glass, which is transparent to solar infrared (IR) radiation and visible wavelength light, while being opaque to thermal IR back-radiation, as a result of the optical properties of the material and the geometry of the material and/or the panel. At the same time, the transparent insulation material is a thermal convection suppressor as a result of the geometry and physical characteristics of the material, and a thermal conduction suppressor as a result of the thermal properties of the material, including for example, thin walls of a honeycomb.

This imbalance of the transparency to incoming solar radiation versus the thermal IR back-radiation and the restricted energy losses due to low convection and conduction create a thermal diode and enable the capturing of heat and use of that captured heat for a variety of energy applications. The use of thermal insulation panels enables much greater energy conversion efficiencies over a much broader range of ambient temperatures and conditions, especially in colder climates as compared to systems that do not use a thermal insulation panel. In certain implementations, the solar absorption surface is coated with a spectrally selective layer that suppresses thermal re-emission in the thermal infrared spectrum, obviating the need for the transparent insulation to be substantially opaque in the thermal infrared spectrum.

Figure 8:
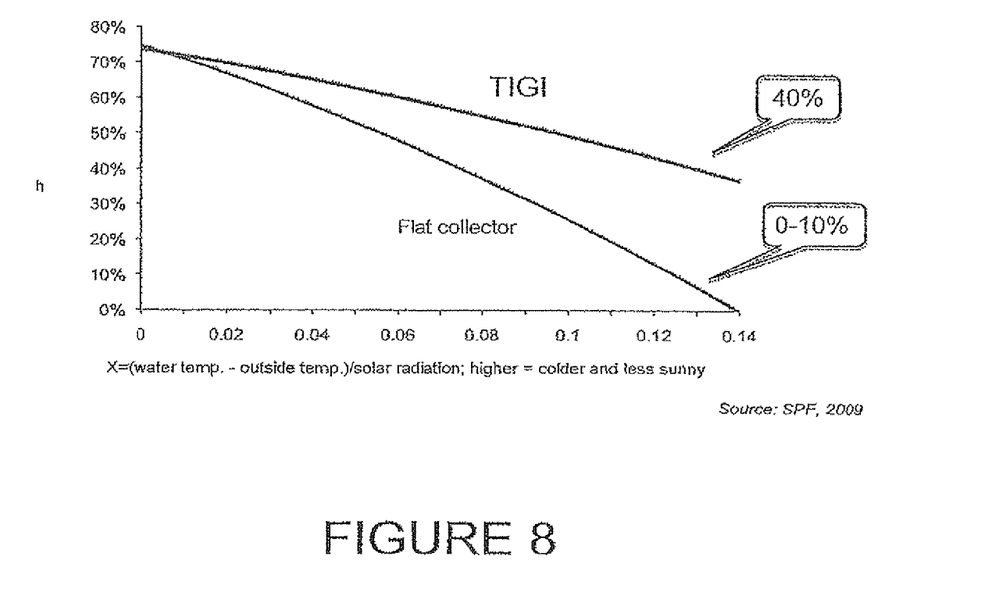
FIG. 8 is a plot of collector efficiencies.

A solar thermal collector with transparent insulation material is known as an insulated solar panel. In this case "insulated" refers to the transparent insulation material, as opposed to the conventional insulation typically used in the back and sides of a solar thermal collector. Insulated solar panels are available from TIGI of Neve Yarak, Israel. An insulated solar panel provides a solar thermal collector with much greater energy conversion efficiencies, as compared to conventional solar thermal collectors. This occurs particularly under conditions of substantial temperature differentials between the ambient temperature and the temperature of the circulating fluid (for example, heated water) inside the collector, for example in cold, high latitudes in winter. Referring to FIG. 8, a plot of collector efficiency (h) as a function (X) based on temperature (where $X=\Delta T/G$ where $\Delta T$ is the temperature difference between ambient and the average collector temperature and G is the global solar radiation), higher values of X indicate colder and less sunny conditions. As can be seen from FIG. 8, the efficiency of an insulated solar panel remains high as the environment gets colder and/or the amount of available solar radiation decreases, as compared to a conventional flat panel collector. When the efficiency of a typical conventional flat panel collector drops to about zero (for example, in the range of 0 to 10%), an insulated solar panel can still operate at an efficiency of about 40%. Greater efficiencies in insulated solar panels, while providing greater benefits than conventional solar panels, also create operational and maintenance challenges that must be addressed for successful operation.

There is therefore a need for innovative solutions to address the new challenges of operating insulated solar panels, in particular internal temperature limiting in the insulated solar panel to prevent degradation or catastrophic damage.

SUMMARY

According to the teachings of the present embodiment there is provided an apparatus including: a solar thermal collector including an absorber and internal insulation; and a heat transfer mechanism including a first section inside the solar thermal collector and on a first side of the internal insulation, and in thermal contact with the absorber, a second section on a second side of the internal insulation, the second side opposite the first side, and the second section in thermal contact with an environment outside of the solar thermal collector; an actuator, wherein below a pre-defined temperature of the first side, the actuator maintains the first side and the second side in thermal isolation, and above the pre-defined temperature the actuator is operative to enable transfer of heat from the first side to the second side.

In an optional embodiment, the solar thermal collector is a sealed insulated solar panel. In another optional embodiment, the second section is inside the sealed insulated solar panel. In another optional embodiment, the second section is outside the solar thermal collector. In another optional embodiment, the environment includes a support structure of the solar thermal collector. In another optional embodiment, the second section is in thermal contact with a portion of an outer casing of the solar thermal collector. In another optional embodiment, the pre-defined temperature is in the range of 90 to 120 degrees Celsius (° C.). In another optional embodiment, the pre-defined temperature is in the range of 120 to 220° C.

In an optional embodiment, the heat transfer mechanism is a heat pipe including: a first end of the heat pipe corresponding to the first section of the heat transfer mechanism; a second end of the heat pipe corresponding to the second section of the heat transfer mechanism; a transfer pipe for transferring heat between the first section and the second section; and a working fluid inside the heat pipe configured to function with the heat pipe as the actuator.

In an optional embodiment, the heat transfer mechanism includes: internal circulation pipes corresponding to the first section; outer circulation pipes corresponding to the second section; an actuator valve corresponding to the actuator, the actuator valve connecting the internal circulation pipes to the outer circulation pipes at a first location; and a circulation connector pipe connecting the internal circulation pipes to the outer circulation pipes at a second location; wherein below a pre-defined temperature of a circulating fluid in the inner circulation pipes, the actuator valve is closed and the circulating fluid flows in the internal circulation pipes, and above the pre-defined temperature of a circulating fluid the actuator valve is open and the circulating fluid flows from the internal circulation pipes via the actuator valve through the outer circulation pipes and via the circulation connector pipe to the internal circulation pipes, thereby transferring heat from the first side to the environment. In another optional embodiment, the first location is at a circulation input pipe. In another optional embodiment, the second location is at a circulation output pipe.

In an optional embodiment, the heat transfer mechanism is a thermal siphon including: siphon circulation pipes corresponding to the first section; outer circulation pipes corresponding to the second section; an actuator valve corresponding to the actuator, the actuator valve connecting the siphon circulation pipes to the outer circulation pipes at a first location; and a circulation connector pipe connecting the siphon circulation pipes to the outer circulation pipes at a second location; wherein below a pre-defined temperature of a circulating fluid in the siphon circulation pipes, the actuator valve is closed, and above the pre-defined temperature the actuator valve is open and the circulating fluid flows from the siphon circulation pipes via the circulation connector pipe through the outer circulation pipes and via the actuator valve to the siphon circulation pipes, thereby transferring heat from the first side to the environment via a thermal siphon effect.

In an optional embodiment, the heat transfer mechanism is a venting tube including: an internal portion corresponding to the first section; an external portion corresponding to the second section open to an environment outside of the solar thermal collector an actuator valve corresponding to the actuator, the actuator valve connecting the first section to the section; and a fluid input pipe operationally connected to the first section; wherein below a pre-defined temperature of a venting fluid in the first section, the actuator is closed and the first section and the second section are substantially thermally isolated, and above the pre-defined temperature the actuator is open; a portion of the venting fluid is released from the first section to the environment thereby transferring heat from the first side to the environment; and the fluid input pipe provides additional venting fluid substantially equal to an amount of released venting fluid. In another optional embodiment, the at substantially the pre-defined temperature a portion of the venting fluid evaporates to steam and when the actuator opens and the steam is released to the environment. In another optional embodiment, at substantially the pre-defined temperature a portion of the venting fluid evaporates to steam and the actuator is an air vent configured to open when sufficient steam has accumulated in the first section, thereby venting a pre-defined quantity of the heated steam to the environment.

In an optional embodiment, the solar thermal collector is a sealed insulated solar panel and the heat transfer mechanism is an air venting conduit including: an internal portion corresponding to the first section; an external portion corresponding to the second section and open to an environment outside of the sealed insulated solar panel; and an actuator valve corresponding to the actuator, the actuator valve connecting the first section to the section; wherein below a pre-defined temperature of the first side, the actuator valve is closed and the first section and the second section are substantially thermally isolated, and above the pre-defined temperature the actuator valve is open allowing air to flow from a first area of the environment through the first section and via the actuator valve to the second section, thereby transferring heat from the first side to the environment.

According to the teachings of the present embodiment there is provided an apparatus including: a sealed insulated solar panel including an absorber and internal thermal insulation; and a heat pipe including: a first section inside the sealed insulated solar panel, on a first side of the internal thermal insulation, and in thermal contact with the absorber; a second section on a second side of the internal thermal insulation, the second side opposite the first side, and the second section in thermal contact with an environment outside of the sealed insulated solar panel; and a transfer pipe for transferring heat between the first section and the second section; wherein below a pre-defined temperature of the first side, the first section and the second section are substantially thermally isolated, and above the pre-defined temperature the heat pipe is operative to transfer heat from the first section to the second section.

In an optional embodiment, the second section is inside the sealed insulated solar panel. In another optional embodiment, the second section is outside the sealed insulated solar panel. In another optional embodiment, the pre-defined temperature is in the range of 90 to 120 degrees Celsius (° C.). In another optional embodiment, the pre-defined temperature is in the range of 120 to 220° C. In another optional embodiment, the heat pipe is configured to operate as a passive thermal switch providing thermal isolation between the first section and the second section below the pre-defined temperature and thermal contact between the first section and the second section substantially at or above the pre-defined temperature.

According to the teachings of the present embodiment there is provided an apparatus including: a sealed insulated solar panel including internal circulation pipes in thermal contact with an absorber and on a first side of internal thermal insulation outer circulation pipes on a second side of the internal thermal insulation, the second side opposite the first side, and the outer circulation pipes in thermal contact with an environment outside of the sealed insulated solar panel; an actuator valve connecting the internal circulation pipes to the outer circulation pipes at a first location; and a circulation connector pipe connecting the internal circulation pipes to the outer circulation pipes at a second location; wherein below a pre-defined temperature of a circulating fluid in the inner circulation pipes, the actuator valve is closed and the circulating fluid flows in the internal circulation pipes, and above the pre-defined temperature the actuator valve is open and the circulating fluid flows from the internal circulation pipes via the actuator valve through the outer circulation pipes and via the circulation connector pipe to the internal circulation pipes, thereby transferring heat from the first side to the environment.

In an optional embodiment, the outer circulation pipes are inside the sealed insulated solar panel. In another optional embodiment, the outer circulation pipes are outside the sealed insulated solar panel. In another optional embodiment, the actuator valve is a passive actuator valve. In another optional embodiment, the actuator valve is an active actuator valve. In another optional embodiment, the first location is at a circulation input pipe. In another optional embodiment, the second location is at a circulation output pipe.

According to the teachings of the present embodiment there is provided an apparatus including: a sealed insulated solar panel including internal circulation pipes in thermal contact with an absorber and on a first side of internal thermal insulation; siphon circulation pipes in thermal contact with the internal circulation pipes; outer circulation pipes on a second side of the internal thermal insulation, the second side opposite the first side, and the outer circulation pipes in thermal contact with an environment outside of the sealed insulated solar panel; an actuator valve connecting the siphon circulation pipes to the outer circulation pipes at a first location; and a circulation connector pipe connecting the siphon circulation pipes to the outer circulation pipes at a second location; below a pre-defined temperature of a circulating fluid in the siphon circulation pipes, the actuator valve is closed, and above the pre-defined temperature the actuator valve is open and the circulating fluid flows from the siphon circulation pipes via the circulation connector pipe through the outer circulation pipes and via the actuator valve to the siphon circulation pipes, thereby transferring heat from the first side to the environment. In an optional embodiment, the outer circulation pipes are inside the sealed insulated solar panel. In another optional embodiment, the outer circulation pipes are outside the sealed insulated solar panel. In another optional embodiment, the actuator valve is a passive actuator valve. In another optional embodiment, the actuator valve is an active actuator valve. In another optional embodiment, the first location is at a circulation input pipe. In another optional embodiment, the second location is at a circulation output pipe.

According to the teachings of the present embodiment there is provided an apparatus including: a sealed insulated solar panel including an absorber and thermal insulation; and a venting tube including: a first section inside the sealed insulated solar panel, on a first side of the thermal insulation, and in thermal contact with the absorber; a second section on a second side of the thermal insulation, the second side opposite the first side, and the second section open to an environment outside of the sealed insulated solar panel; an actuator valve connecting the first section to the section; and a fluid input pipe operationally connected to the first section; wherein below a pre-defined temperature of a venting fluid in the first section, the actuator valve is closed and the first section and the second section are substantially thermally isolated, and above the pre-defined temperature the actuator valve is open; a portion of the venting fluid is released from the first section to the environment thereby transferring heat from the first side to the environment; and the fluid input pipe provides additional venting fluid substantially equal to an amount of released venting fluid. In an optional embodiment, at substantially the pre-defined temperature, a portion of the venting fluid evaporates to steam and when the actuator valve opens and the steam is released to the environment. In another optional embodiment, at substantially the pre-defined temperature a portion of the venting fluid evaporates to steam and the actuator valve is an air vent configured to open when sufficient steam has accumulated in the first section, thereby venting a pre-defined quantity of the heated steam to the environment.

According to the teachings of the present embodiment there is provided an apparatus including: a sealed insulated solar panel including an absorber and thermal insulation; and an air venting conduit including: a first section inside the sealed insulated solar panel, on a first side of the thermal insulation, and in thermal contact with the absorber; a second section on a second side of the thermal insulation, the second side opposite the first side, and the second section open to an environment outside of the sealed insulated solar panel; and an actuator valve connecting the first section to the section; wherein below a pre-defined temperature of the first side, the actuator valve is closed and the first section and the second section are substantially thermally isolated, and above the pre-defined temperature the actuator valve is open allowing air to flow from a first area of the environment through the first section and via the actuator valve to the second section, thereby transferring heat from the first side to the environment.

BRIEF DESCRIPTION OF FIGURES

The embodiment is herein described, by way of example only, with reference to the accompanying drawings, wherein.

DETAILED DESCRIPTION

The principles and operation of the system according to a present embodiment may be better understood with reference to the drawings and the accompanying description. A present embodiment is a system and method for temperature limiting in a sealed solar energy collector. The system facilitates passive or active limiting of temperature inside a solar thermal collector by the automated temperature induced action of an actuator that causes an abrupt transition from a state of thermal isolation from an environment to one of strong thermal coupling.

In an insulated solar panel, innovative solutions are required to allow operation at temperatures that are typically significantly higher than in conventional solar thermal collectors, in order to enable temperature limitation to prevent damage of the insulated solar panel. A feature of the below-described embodiments for temperature limiting insulated solar panels is that the temperature limiting is provided by the insulated solar panel, as opposed to conventional systems that either rely on the connected applications for temperature limiting or cease operating when the temperature of the solar thermal collector exceeds a conventional operating range. This feature allows an insulated solar panel to continue operating, distributing collected solar energy to applications, at significantly higher temperatures than conventional solar collecting systems. Another feature of the below-described embodiments is that the embodiments can be implemented independent of the sealed components of a solar thermal collector. This feature allows isolation of internal components of a solar thermal collector from the environment, while facilitating limiting of the internal temperature via thermal coupling with the environment. Additional features facilitated by the below embodiments include implementation as passive closed systems within the sealed solar thermal collector, while also allowing alternative implementations as active systems and/or portions of the temperature limiting system outside the sealed solar thermal collector.

In order to extend the lifetime and guarantee the performance of a solar thermal collector, solar thermal collectors are sometimes sealed, as for example with vacuum tube collectors or noble gas filled collectors. In the current embodiment, such sealing enables isolation of the internal components, such as the transparent insulation, from the environment. Sealing is of particular importance in insulated solar panels, since condensation (of water) could otherwise occur on the inner surface of the collector front panel where the transparent insulation comes in contact with the transparent cover of the panel. Such condensation is difficult to remove in the presence of transparent insulation, and may produce short-term efficiency reduction and long-term degradation of the collector. In the context of this document, the term environment generally refers to the area outside of a solar thermal collector, and is also known as the ambient atmosphere. The environment includes, but is not limited to the air or vacuum surrounding a solar thermal collector and/or the material(s) to which the solar thermal collector is adjacent, including but not limited to building walls and support structures for the solar unit. Sealing reduces the risks of condensation and residual chemical contamination. The sealed enclosure also enables replacement of ambient gas within the solar thermal collector with a medium of superior thermal characteristics, (slower conduction and convection) such as Argon or Krypton. However, sealing the solar thermal collector creates new challenges, such as risks related to pressure build up and catastrophic breakdown of the enclosure. For an insulated solar panel, these risks are exacerbated by the increased volume of the solar panel due to the inclusion of a transparent insulating layer, together with the wider range of temperature fluctuation enabled by the transparent insulation.

For solar collecting systems, two temperatures are discussed, the internal temperature of the solar thermal collector and the temperature of the circulating fluid. In the context of this document, the term internal temperature refers to the temperature inside a solar thermal collector or insulated solar panel, typically in an area near the absorber. In the context of this document, the term absorber refers to the typically black (usually metallic high thermal conductivity) surface that is responsible for absorbing the solar radiation and converting the solar radiation to heat, which is subsequently transferred out of the system by a heat transfer fluid (circulating fluid). Under extreme conditions, the internal temperature of a solar thermal collector can reach a stagnation temperature, which is a temperature at which energy is not withdrawn from the system, or in other words solar radiation energy is being input to the panel, but no additional energy is being withdrawn from the solar collecting system. The temperature of the circulating fluid is typically limited by safety devices associated with the applications. One popular example of safety devices are pressure relief valves that are used to prevent overheating and damage to components of an application.

Under normal operating conditions, conventional flat panel solar thermal collectors typically operate with internal temperatures in the range of 30 to 90 degrees Celsius (° C.), with stagnation temperatures of about 130° C., up to possibly 200° C. Conventional vacuum tube solar thermal collectors may reach a maximum operating temperature of about 130° C., with stagnation temperatures of about 200° C.

As mentioned above, an insulated solar panel provides a solar thermal collector with much greater energy conversion efficiencies, as compared to conventional solar thermal collectors. Correspondingly, the stagnation temperatures in an insulated solar panel are significantly higher than conventional solar thermal collectors, typically up to about 250° C., with internal temperatures of 270 to 300° C. possible. If the internal temperature of an insulated solar panel is not limited, the internal temperature could reach these significantly higher stagnation temperatures, resulting in damage to the components of the insulated solar panel. In contrast, conventional solar collecting systems typically reach stagnation at temperatures in the range of 160 to 200° C., are designed to withstand component damage at these temperatures, and there is no need to limit the temperature in the solar thermal collector.

Conventional solar collecting systems include features to prevent overheating and/or freezing and damage to the various components of the solar collecting system. Solar radiation is intermittent and varies stochastically, varying the solar gain of a solar thermal collector. The load of thermal energy from one or more applications also varies with time. Therefore, conventional solar collecting systems face potential overheating of the circulation fluid whenever the solar gain and the load are significantly mismatched. One popular implementation to prevent damage to a solar collecting system is to use an active mechanism to cover the solar thermal collector and prevent sunlight from reaching the absorber. Another popular technique is continuous circulation of the circulation fluid within the system to draw heat away from the solar thermal collector to an associated application, with the application providing pressure relief valve guards. Pressure relief valves are used to prevent overheating and damage to components of an application. The components of conventional solar thermal panels can be chosen to survive conventional stagnation temperatures, and return to operation when the internal temperature of the solar thermal collector drops to the operating temperature range.

To operate an insulated solar panel at the above-described temperatures and prevent damage to the insulated solar panel and solar collecting system, innovative solutions are required to limit the stagnation temperature of the insulated solar panel. One innovative solution includes using a heat pipe as a passive thermal switch, where the temperature induced action at a pre-determined temperature causes an abrupt transition from a state of thermal isolation from the environment to a state of strong thermal coupling. A related innovative solution includes using at least a second set of circulation pipes, where the temperature induced action of an actuator causes an abrupt transition from internal circulation pipes being in a state of thermal isolation from the environment to a state of strong thermal coupling using the second set of circulation pipes.

Heat pipes are widely used in a specific family of conventional solar collecting systems, known as vacuum tubes, to transfer heat from a solar thermal collector to an application. When the internal temperature of the solar thermal collector exceeds the desired operating temperature range of the application, typically various techniques are used to stop the heat pipe transfer mechanism. Publically available design guides (for example, Thermomax Technical Design Guide published by Kingspan Group Plc, West Yorkshire, England, and papers (for example, *Vacuum Tube Liquid-Vapor (Heat-Pipe) Collectors*, by Dr. F. Mahjouri, published by Thermo Technologies, Columbia, Md., USA, 2010) are focused on techniques for stopping the heat transfer mechanism, which prevents damage to components of an application. While the temperature of the solar thermal collector continues to exceed the operating temperature of the applications, the heat pipes remain inactive, hence protecting the applications from excessive temperature. As described above, components of conventional solar thermal panels can be chosen that will not be damaged by conventional stagnation temperatures.

Figure 1:
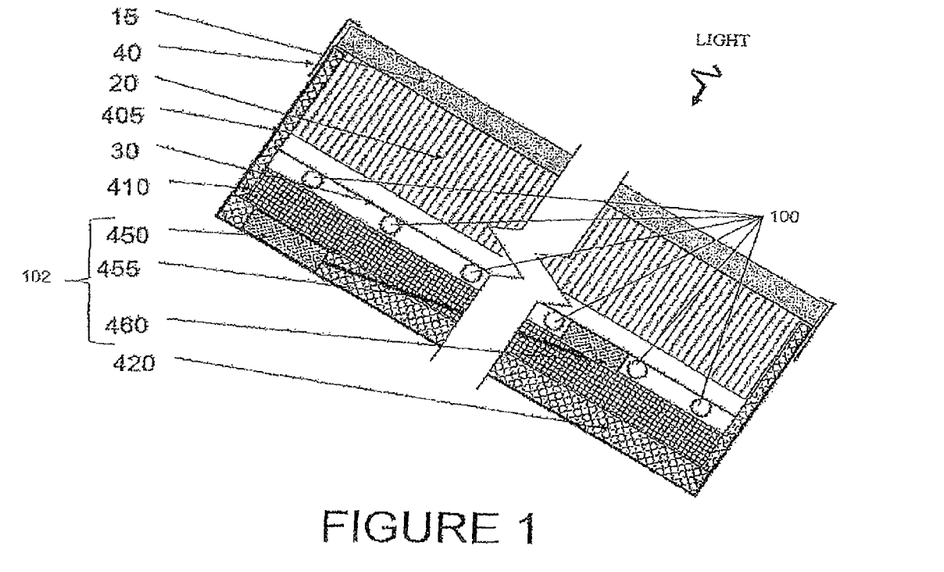
FIG. 1 is a diagram of a sealed insulated solar panel with heat pipe.

As described above, in an insulated solar panel, innovative solutions are required to allow operation at temperatures that are typically significantly higher than in conventional solar thermal collectors, in order to enable temperature limitation to prevent damage of the insulated solar panel. Referring now to the drawings, FIG. 1 is a diagram of a sealed insulated solar panel with heat pipe. Low emissivity (low-E) glass 15 is held by a frame 40 allowing LIGHT (as near IR and visible wavelength light are typically referred to in this context) through transparent insulation 20 to reach absorber 30. Circulation pipes 100 (end-view as shown by circles below/behind absorber 30) circulate a transfer fluid to absorb heat from the absorber 30 and transfer the heat to applications. Note that connections between circulation pipes 100 and applications are not shown. Note also that for clarity a single solar panel is shown. Typically, multiple solar panels are used with serial and/or parallel connections between solar panels within a solar array. In a case like this connections to and from circulation pipes of a single solar panel can be from or to (respectively) applications or one or more solar panels. Configuration and connection between solar panels and applications will be obvious to one skilled in the art. Internal thermal insulation 410 separates an internal area of the insulated solar panel with the absorber 30 from an area in contact with the environment. Lateral thermal insulation 405 and rear thermal insulation 420 provide a thermal barrier on sides and back, respectively. Optionally the internal thermal insulation 410 can be chosen and configured with the other components of the insulated solar panel such that separate rear insulation 420 is not required.

Heat pipe 102 includes first section 460 inside the sealed unit, on a first side of internal thermal insulation 410, and in thermal contact with the absorber 30; a transfer pipe 455; and a second section 450 located on a second side of internal thermal insulation 410 and in thermal contact with the environment outside of the sealed insulated solar panel. In the context of this document, thermal contact generally refers to two objects being configured relative to each other such that heat can be exchanged between the two objects. In contrast, thermally isolated generally refers to areas between which the heat exchange is substantially equal to zero.

In a preferred implementation, the second section 450 of heat pipe 102 is inside a sealed unit and thermal contact with the environment can be via the casing of the sealed unit. In an alternative implementation (not shown), the second section 450 can be located outside a sealed unit and in direct thermal contact with the environment and/or in contact with mounting hardware of an insulated thermal unit. In general, in the described embodiments, in a case where the second section is located outside a sealed unit, the function of internal thermal insulation 410 can be implemented by rear insulation 420 and/or lateral thermal insulation 405.

Transfer pipe 455 is for transferring heat between the first section 460 and the second section 450. Below a pre-defined temperature in the first section (or substantially equivalently the temperature on the first side of the internal thermal insulation 410, or in the area near the absorber 30, the first section and the second section are substantially thermally isolated, and above the pre-defined temperature the heat pipe is operative to transfer heat from the first section to the second section. Note that when the heat pipe is not actuated, and the first and second sections are substantially thermally isolated, due to operational realities there may be a relatively small heat transfer (relative to operation of the heat pipe when actuated to provide thermal contact between the two sections). A feature of the current embodiment is the desirability of having heat increase (build up) in the first section, until a pre-determined temperature is reached, resulting in the loss of minimal heat from the first section during normal operation. In contrast, heat pipes are conventionally used to transfer a maximum amount of heat starting at a minimum temperature.

The heat pipe is configured to operate as a passive thermal switch providing thermal isolation between the first section and the second section below the pre-defined temperature and thermal contact between the first section and the second section substantially at or above the pre-defined temperature.

In one implementation, the pre-defined temperature in the area of the absorber 30 is a temperature in the range of 90 to 100 degrees Celsius (° C.). In another implementation, the pre-defined temperature is in the range of 130 to 150° C. Based on this description, one skilled in the art will be able to choose an appropriate working temperature for a specific solar thermal collector. In the context of this document, the term working fluid generally refers to a fluid inside a heat pipe, chosen to function at a given (pre-determined) temperature range. In the present embodiment, the working fluid and pressure in the heat pipe are selected such that the working fluid undergoes a phase transition from liquid to gas, i.e. evaporates, at the desired pre-defined temperature for the first section and second section to transition from a state of substantial thermal isolation to a state of thermal transfer, or in other words place the two sections in thermal contact.

In an alternative implementation, (not shown in FIG. 1) the heat pipe is in the shape of a loop. A closed loop heat pipe, also simply referred to as a heat pipe loop, is constructed of two parallel conduits, whereby after evaporation in the evaporation bulb, the internal fluid moves in a gaseous state along a first half of the loop and after condensation in condensation bulb returns in the liquid state by gravitational means along a second half of the loop.

Figure 2:
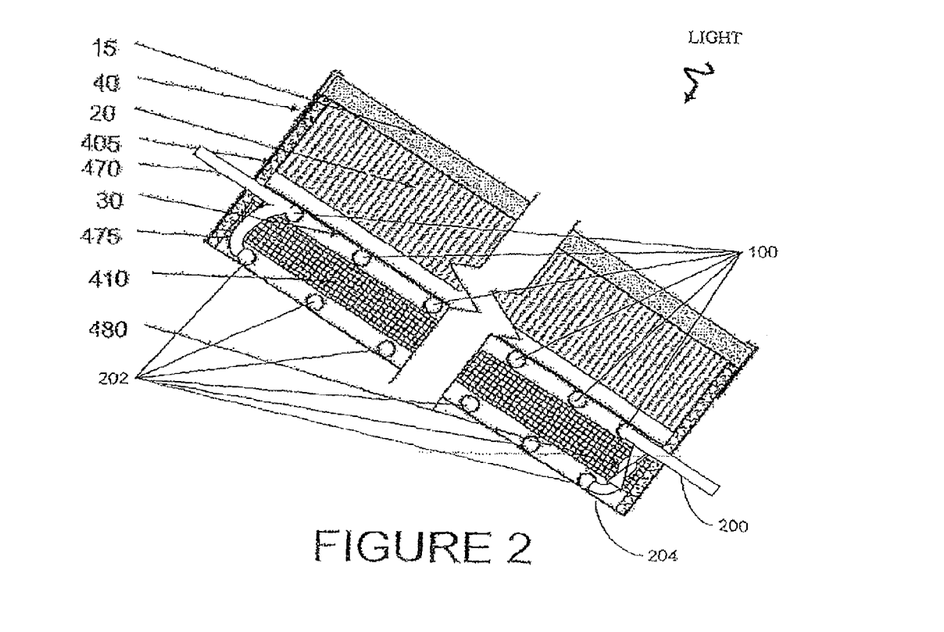
FIG. 2 is a diagram of a sealed insulated solar panel with a metallic cover heat sink.

Referring now to the drawings, FIG. 2 is a diagram of a sealed insulated solar panel with a metallic cover heat sink. As described above, a feature of this embodiment is that the temperature limiting is provided by the insulated solar panel, as opposed to conventional systems that rely on the connected applications for temperature limiting. An additional feature of the embodiment of FIG. 2 is circulation of fluid in multiple paths for a solar thermal collector. Circulation within a sealed solar thermal collector can be used for temperature limiting of sealed solar thermal collectors.

In the context of this document, the term circulating fluid generally refers to a fluid that is flowing through the solar collection system from a solar thermal panel (array) to applications and back to the solar thermal panel (array). Depending on the application, the circulating fluid may be water, a glycol such as ethylene glycol, a mixture of water and a glycol, or some other fluid. One skilled in the art will be able to select a circulating fluid based on the specific application.

A circulating fluid enters the solar panel via circulation input pipe 200, flows through circulation pipes 100 where the fluid absorbs heat from absorber 30, increasing the temperature of the circulating fluid. Circulation pipes 100 are also referred to as internal circulation pipes. The circulating fluid exits the solar panel via circulation output pipe 470. At a predefined temperature, actuator valve 480 opens, allowing the circulating fluid to circulate also in outer circulation pipes 202. Internal thermal insulation 410 separates an internal area of the insulated solar panel including the absorber 30 from an area in contact with the environment. The circulating fluid in the outer circulation pipes is in thermal contact with the environment via the outer circulating pipes 202 via a metallic cover heat sink 204, releasing heat from the circulating fluid in the outer circulation pipes to the environment, thereby decreasing the temperature of the circulating fluid in the outer circulation pipes. Circulation connector pipe 475 provides a path for the circulating fluid in the outer circulation pipes to mix with the circulating fluid in the circulation pipes 100, and then exit the solar panel via circulation output pipe 470.

In a case when flow of the circulating fluid to and from the insulated solar panel is cut off, the highest risk of overheating occurs. In this situation, although there is no flow between the insulated solar panel and the applications, as the internal temperature rises, actuator valve 480 will open and the fluid will begin to circulate counter-clockwise in the restricted loop between the inner circulating pipes 100 and the outer circulating pipes 202 by a thermal siphon mechanism.

Connections between circulation pipes 100 and other system components are shown as circulation input pipe 200 from the other system component(s) and circulation output pipe 470 to the other system component(s). As described above in reference to FIG. 1, for clarity a single solar panel is shown. Typically, circulation input pipe 200 comes from one or more solar panels or from one or more applications and circulation output pipe 470 connects to one or more solar panels or from one or more applications, to create a solar array. Serial connections typically come from an application if the solar panel of is at the beginning of the array, or to an application if the solar panel of is at the ending of the array. Serial connections can also connect to/from other solar panels. Parallel connections typically connect from/to multiple solar panels using a shared input pipe 200/circulation output pipe 470, respectively. Refer to the description of FIG. 4, below, for a non-limiting example of connections and flow through a solar array.

Actuator valve 480 is activated by rising temperature in the area of internal circulating pipes 100, or in other words, by the temperature of the fluid circulating in circulating pipes 100. In particular, the actuation temperature of the actuator valve 480 is designed to allow operation of the solar panel until the temperature in the area of the absorber 30 reaches a predefined temperature. A preferred implementation is for actuator valve 480 to be a passive flow valve. Passive flow valves are known in the art. Popular implementations are made of wax such as available from Rostra Vernatherm LLC, Bristol, Conn., USA. In an alternative implementation, actuator valve 480 is an active valve, triggered by a condition, operating mode, or other state of the solar collecting system. One implementation of an active valve is an electronically activated valve connected to a temperature sensor in the circulating fluid or at another significant point within the solar panel.

In the case of an active actuator valve 480, the actuator valve can be located in various locations, including but not limited to, external to the sealed solar panel. This configuration increases the complication of the system, but facilitates the circulating fluid being split outside of the sealed solar panel, allowing the outer circulation pipes 202 to be located in the environment. Circulation connector pipe 475 can be located inside the sealed solar panel, or outside the sealed solar panel. It is foreseen that other configurations of the actuator valve 480, outer circulation pipes 202, and circulation connector pipe 475 can be used depending on the specific application.

When actuated, actuator valve 480 allows a circulating fluid to also circulate in outer circulating pipes 202 and release heat to the environment. A preferred implementation is where the actuator valve 480 and outer circulating pipes 202 are internal to a sealed insulated solar panel, and thermal contact with the environment outside the sealed solar panel is via a metallic cover heat sink 204. Alternative implementations for a heat sink are possible, including but not limited to, other materials and/or configurations of the case of the sealed solar panel. In an alternate implementation (not shown), the outer circulating pipes 202 can be located outside a sealed unit and in direct thermal contact with the environment and/or in contact with mounting hardware of an insulated thermal unit.

Depending on the application, the size and/or configuration of the (internal) circulating pipes 100, the outer circulating pipes 202, and/or the actuator valve 480 can be configured to control the amount of flow between the circulating pipes 100 and outer circulating pipes 202. In a non-limiting example, 50% of the fluid flows via circulating pipes 100 and 50% via outer circulating pipes 202. In another non-limiting example, 80% of the fluid flows via circulating pipes 100 and 20% via outer circulating pipes 202. Based on this description, one knowledgeable in the art will be able to configure circulation for a specific application.

Figure 4:
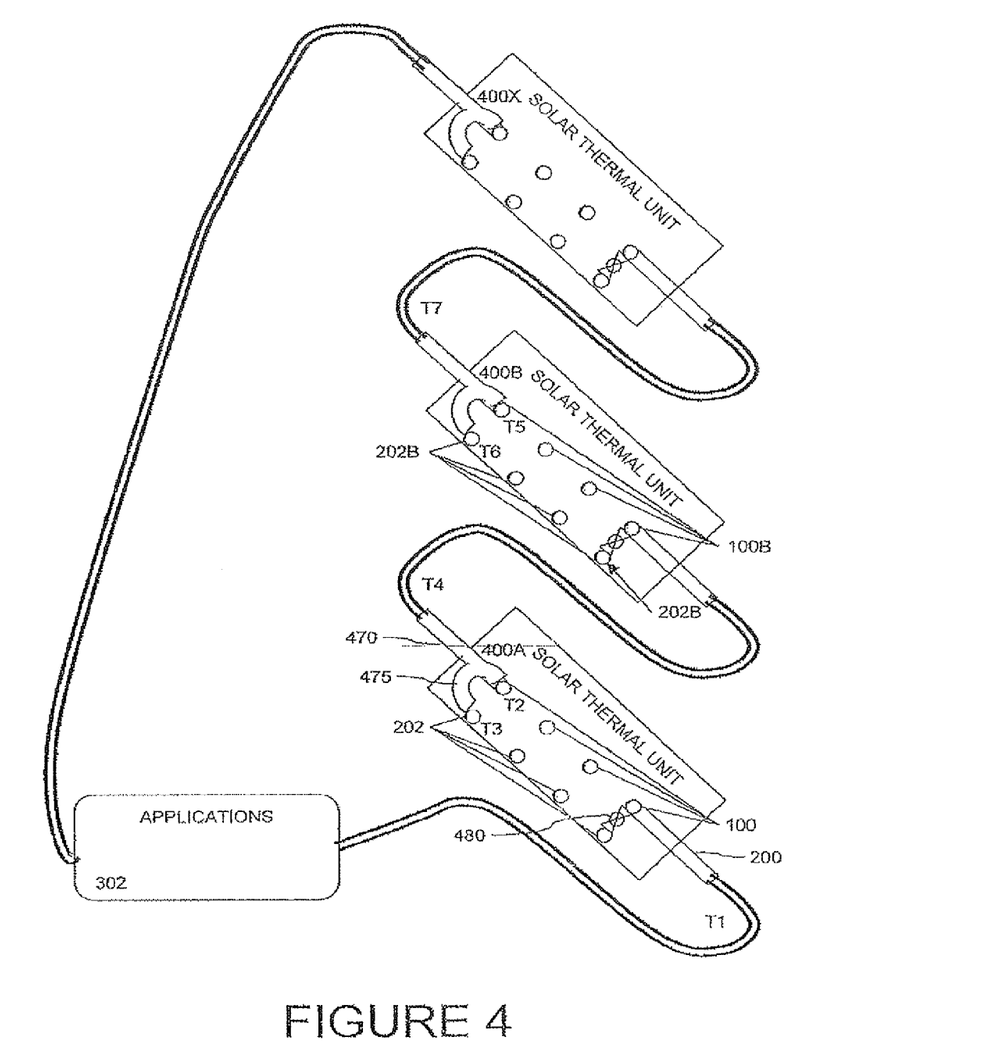
FIG. 4 is a diagram of temperature flow through multiple sealed insulated solar panels with multiple circulation pipes.

Referring to FIG. 4, a diagram of temperature flow through multiple sealed insulated solar panels with multiple circulation pipes, the temperature at various points in a flow can be seen. Circulating fluid from applications 302 at temperature T1 enters a first solar thermal collector 400A via circulation input pipe 200. Under normal operation, the circulating fluid circulates through circulation pipes 100 where the fluid absorbs heat, increasing the input temperature T1 of the circulating fluid to temperature T2. The fluid exits solar thermal collector 400A via circulation output pipe 470. At a predefined temperature, actuator valve 480 opens, allowing the circulating fluid to circulate also in outer circulation pipes 202. The circulating fluid in outer circulation pipes 202 releases heat to the environment, thereby decreasing the temperature of the circulating fluid in the outer circulation pipes to temperature T3. Circulation connector pipe 475 provides a path for the circulating fluid in the outer circulation pipes 202 to mix with the circulating fluid in the internal circulation pipes 100. The resulting combined fluid exits solar thermal collector 400A via circulation output pipe 470 at temperature T4. Temperature T4 is a temperature less than temperature T2 and greater than temperature T3, providing a reduced temperature T4, for input to solar thermal collector 400B. In this context, reduced temperature is in comparison to temperature T2. In a conventional solar thermal collector the increased temperature T2 (as compared to input temperature T1), would be supplied as temperature T4 to the next solar panel(s), in this case solar thermal collector 400B.

Solar thermal collector 400B operates similarly to the description of solar thermal collector 400A: input circulating fluid at temperature T4 circulates through circulation pipes 100B increasing the input temperature T4 of the circulating fluid to temperature T5. The circulating fluid in outer circulation pipes 202B decreases to temperature T6. The combined fluid exits solar thermal collector at temperature T7 providing a reduced temperature T7, for additional solar thermal collectors 400X. The result on a system level, or in other words looking at the effect of this embodiment on a solar array, is a decrease in the temperature of the circulating fluid, hence taking away the excess heat from the inside of the collectors. This embodiment facilitates a solar array for passively limiting the temperature within the solar array. This effectively limits the internal temperature of a solar thermal collector, protecting the solar unit from degradation or catastrophic damage.

Figure 5:
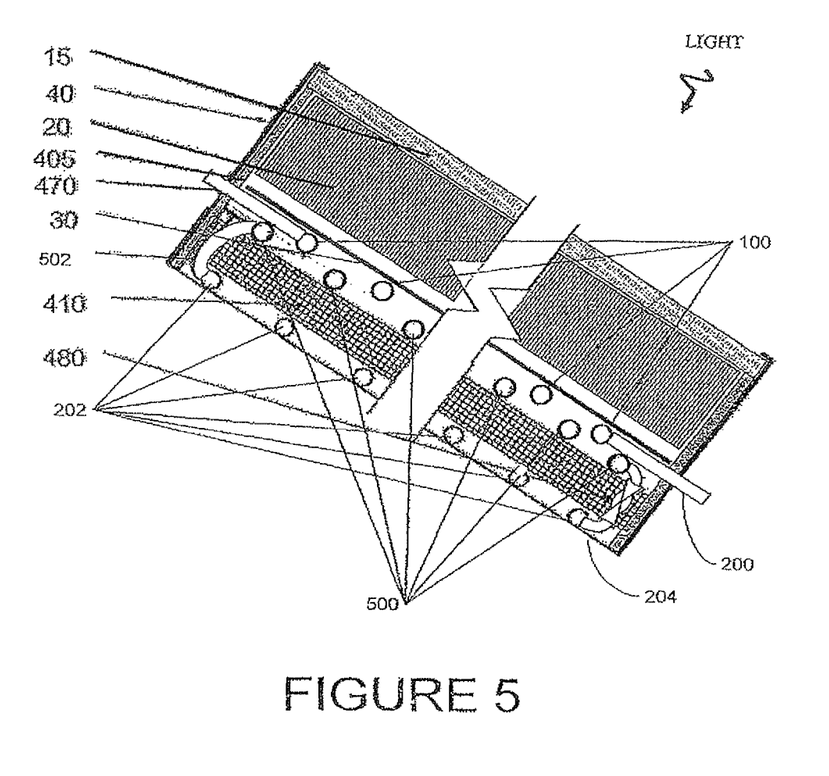
FIG. 5 is a diagram of a sealed insulated solar panel with independent thermal siphon.

While above-described embodiment, in reference to FIG. 2 and FIG. 4, is effective, a preferred embodiment features a thermal siphon independent of the circulating fluid and internal circulating pipes 100. FIG. 5 is a diagram of a sealed insulated solar panel with independent thermal siphon. A third set of siphon circulation pipes 500 are in thermal contact with circulation pipes 100, hence in thermal contact with an internal area of the insulated solar panel including the absorber 30. As compared to FIG. 2, where (internal) circulation pipes 100 are connected to outer circulation pipes 202, siphon circulation pipes 500 are connected to outer circulation pipes 202, thereby forming a closed system in which the circulating fluids are independent. In other words, the circulating fluid of internal circulation pipes 100 is independent of the circulating fluid of siphon circulation pipes 500 and outer circulation pipes 202.

The system of siphon circulation pipes 500 and outer circulation pipes 202 functions as a thermal siphon for drawing excess heat from inside a solar thermal collector, thereby limiting the internal temperature of the solar thermal collector. An actuator 480 functions similarly to the description in reference to FIG. 2, allowing normal operation of the solar thermal collector until a pre-defined temperature has been reached, at which actuator 480 opens, thereby activating the thermal siphon. When the thermal siphon is active, heat is absorbed by the circulating fluid in siphon circulation pipes 500. The circulating fluid circulates counter-clockwise (as viewed in the current figure) through circulation connector pipe 502 to outer circulation pipes 202. Heat is shed from outer circulation pipes 202 that are in thermal contact with the environment of the solar thermal panel. The circulating fluid continues to circulate counter-clockwise through open actuator 480 to internal circulation pipes 100, where the process is repeated. In alternative implementations, similar to the descriptions in reference to FIG. 2, the outer circulation pipes 202 can release heat from the circulating fluid via a metallic cover heat sink 204, or via the case of the sealed solar thermal collector. Optionally and/or additionally, the outer circulation pipes 202 of the thermal siphon can be located outside the sealed solar thermal collector.

Note that in an implementation where actuator 480 is a passive actuator, the thermal siphon system is a passive system, hence not requiring connections such as power input, communications, or control.

Figure 6A:
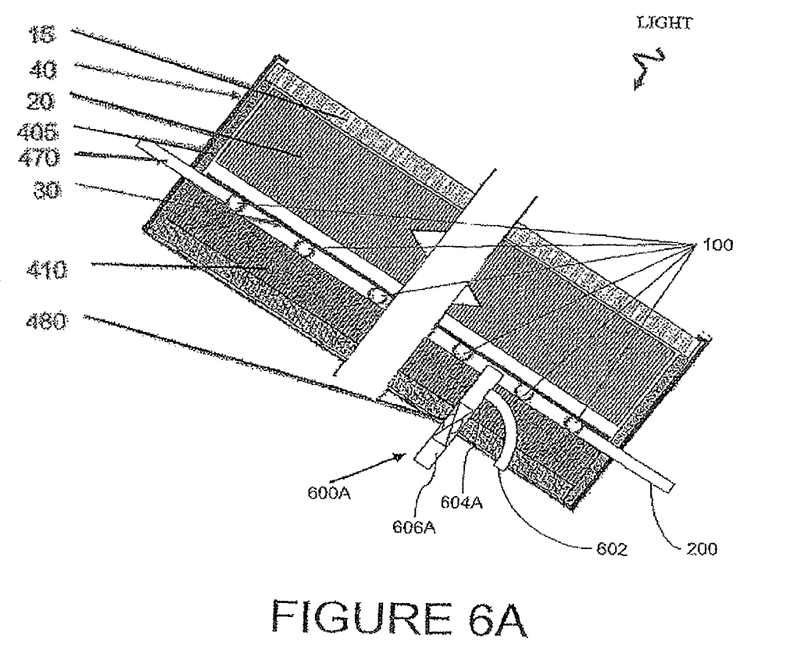
FIG. 6A is a diagram of an exemplary implementation of a fluid venting pipe.

Referring to FIG. 6A, a diagram of an exemplary implementation of a fluid venting pipe, a sealed insulated solar panel features a venting pipe 600A having an internal portion 604A in thermal contact with an internal area of the insulated solar panel including the absorber 30, and an external portion 606A in thermal contact with the environment. The venting pipe 600A facilitates venting excess heat from inside a solar thermal collector, thereby limiting the internal temperature of the solar thermal collector. As the internal temperature of the solar thermal collector rises, the temperature of a venting fluid inside the internal portion of the venting pipe rises. An actuator 480 functions similarly to the description in reference to FIG. 2, allowing normal operation of the solar thermal collector until a pre-defined temperature has been reached, at which actuator 480 opens, thereby venting a pre-defined quantity of the heated venting fluid to the environment Venting the heated fluid reduces the temperature (and/or pressure) in the venting pipe, thereby shedding the excess internal heat of the solar thermal collector to the environment Repetition of the heating and venting process can continue to draw excess heat from the solar thermal panel thereby limiting the internal temperature of the solar thermal collector.

Figure 6B:
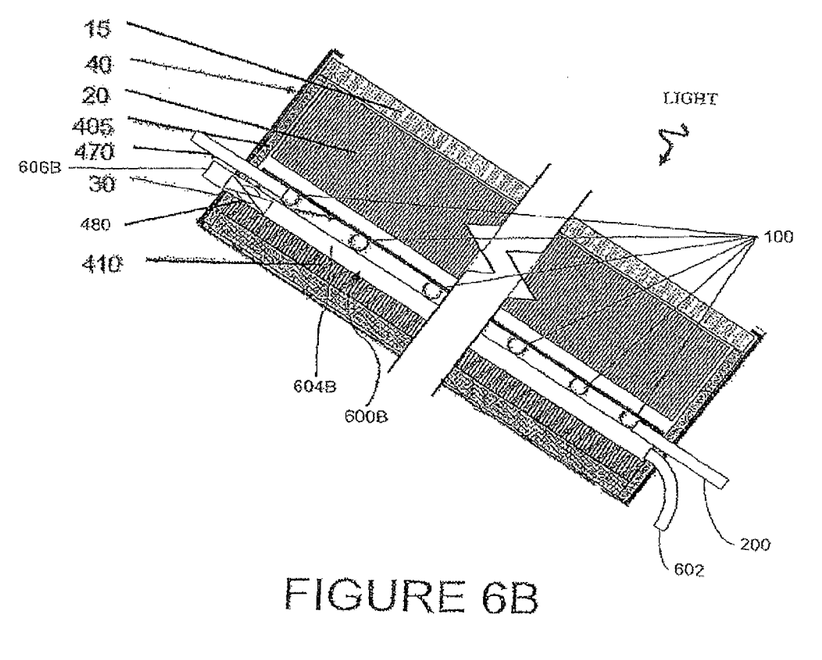
FIG. 6B is a diagram of an exemplary implementation of a steam venting pipe.

While the above-described embodiment, in reference to FIG. 6A is effective, a preferred embodiment features a steam venting pipe as shown in FIG. 6B, a diagram of an exemplary implementation of a steam venting pipe. Operation of the steam venting pipe is similar to the operation of the fluid venting pipe. A sealed insulated solar panel features a steam venting pipe 600B having an internal portion 604B in thermal contact with an internal area of the insulated solar panel including the absorber 30, and an external portion 606B in thermal contact with the environment. As the internal temperature of the solar thermal collector rises, the temperature of a fluid inside the internal portion of the venting pipe rises and evaporates to steam. An actuator 480 functions similarly to the description in reference to FIG. 2, allowing normal operation of the solar thermal collector until a pre-defined temperature has been reached, at which actuator 480 opens, thereby venting a pre-defined quantity of the heated steam to the environment. Venting the heated steam reduces the temperature (and/or pressure) in the venting pipe, thereby shedding the excess internal heat of the solar thermal collector to the environment.

When the internal temperature drops to normal operating temperatures, fluid input pipe 602 can be used to transfer liquid into the internal portion (606A, 606B) of a venting pipe (600A, 600B). In a case where the internal temperature of the solar thermal collector remains excessive, the fluid input pipe 602 can be used to supply additional fluid to the internal portion of the venting pipe and allow temperature limiting operation to continue.

In one implementation, fluid input pipe 602 is open to steam venting pipe 600B. As steam is vented from steam venting pipe 600B via actuator 480, an amount of fluid sufficient to replace the vented steam flows from fluid input pipe 602 into the internal portion 604B.

An alternative implementation adds a second temperature actuated valve (not shown in FIG. 6B) to steam venting pipe 600B near fluid input pipe 602. When the temperature of the fluid inside steam venting pipe 600B rises to a pre-determined temperature, the second temperature actuated valve opens, allowing additional, cooler fluid to enter venting pipe 600B.

In an alternative implementation, actuator valve 480 can be replaced by an air vent. Air vents are known in the art and are typically used for bleeding unwanted air from circulation pipes. Air vents typically operate as a float that normally floats in the water of the circulation pipes, and is normally closed. When unwanted air is in the circulation pipes, the system is designed so that the air accumulates at the location of the air vent. When sufficient air has accumulated, the air vent opens and the unwanted air is released from the circulation pipes to the environment. In contrast to the typical use of an air vent, actuator valve 480 can be replaced by an air vent configured to open (actuate) when sufficient steam has accumulated, thereby venting a pre-defined quantity of the heated steam to the environment.

In another implementation, actuator valve 480 can be a temperature activated two-way valve selected to open at substantially the temperature of the boiling point of the fluid in the internal portion 604B. When the fluid boils and converts to steam, the temperature activated two-way valve is activated, thereby venting the steam to the environment.

The internal fluid, geometries of the venting pipe (600A, 600B), and operational parameters of the actuator 480 can be chosen to limit the internal temperature of a solar thermal collector as appropriate for a desired use of the solar thermal collector. Depending on the use of the solar thermal collector, based on this description one skilled in the art will be able to select the quantity, location, configuration, and connections of the venting pipe, actuator, and fluid input pipe. It is preferred, and highly recommended, that since the fluid is being vented to the environment, an environmentally safe and approved fluid, such as water, be used in the venting pipe.

The venting pipe temperature limiting systems can be implemented independent of the sealed components of a solar thermal collector. This feature allows isolation of internal components of a solar thermal collector from the environment, while facilitating limiting of the internal temperature via thermal coupling with the environment.

Figure 7A:
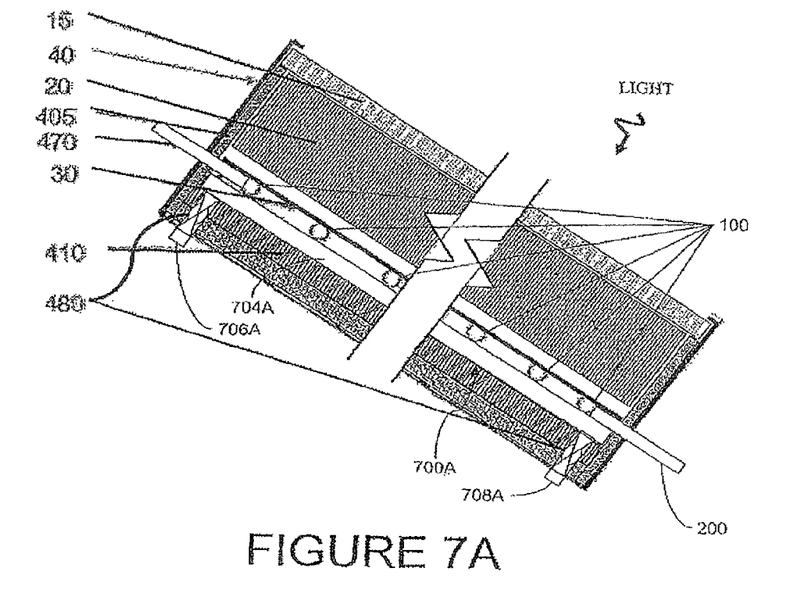
FIG. 7A is a diagram of an exemplary implementation of an air venting sub-system.

Referring to FIG. 7A, a diagram of an exemplary implementation of an air venting sub-system, a sealed insulated solar panel features an air venting conduit 700A having an internal portion 704A in thermal contact with an internal area of the insulated solar panel including the absorber 30, and external portions 706A and 708A in thermal contact with the environment. The air venting temperature limiting sub-system can be implemented independent of the sealed components of a solar thermal collector. In other words, the air venting conduit is topologically part of the environment, while transparent insulation and other components are sealed inside the solar thermal collector and isolated from the environment. This feature allows isolation of internal components of a solar thermal collector from the environment, while facilitating limiting of the internal temperature via thermal coupling with the environment.

In contrast, conventional systems using environmental air cooling connect the components to be cooled with the environment U.S. Pat. No. 7,143,762, Method and apparatus for solar collector with integral stagnation temperature control, to Stephen J. Harrison et al teaches a temperature activated damper that allows air from the environment to pass through the inside of a solar thermal collector. As described above, allowing contact between the internal components of a solar thermal collector and the environment can have a negative effect on the efficiency and result in degradation of components and the solar thermal collector. Sealing is of particular importance in insulated solar panels, since condensation could otherwise occur on the inner surface of the collector front panel where the transparent insulation comes in contact with the transparent cover of the panel. Hence, a system is needed that allows isolation of internal components of a solar thermal collector from the environment, while facilitating limiting of the internal temperature via thermal coupling with the environment.

Figure 7B:
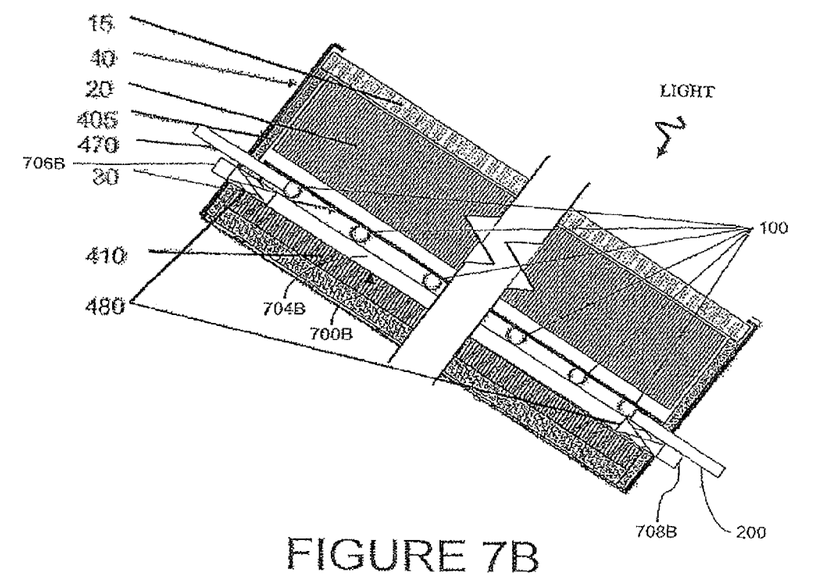
FIG. 7B is a diagram of a second exemplary implementation of an air venting conduit.

The air venting conduit 700A facilitates venting excess heat from inside a solar thermal collector, thereby limiting the internal temperature of the solar thermal collector. As the internal temperature of the solar thermal collector rises, the temperature of the air inside the internal portion of the air venting conduit rises. A pair of actuators 480 function similarly to the description in reference to FIG. 2, allowing normal operation of the solar thermal collector until a pre-defined temperature has been reached, at which the pair of actuators 480 opens, thereby allowing relatively cooler air from the environment to circulate in thermal contact with the internal area of a solar thermal collector. Flow of air from the environment through the air venting conduit reduces the temperature in the internal area of the solar thermal collector, thereby shedding the excess internal heat of the solar thermal collector to the environment. An alternative configuration is shown in FIG. 7B, a diagram of an second exemplary implementation of a air venting conduit, where actuators 480 are positioned on opposite ends of the air venting conduit, at the bottom and top of a solar thermal collector. Air venting conduit 700B has an internal portion 704B in thermal contact within internal area of the insulated solar panel including the absorber 30, and external portions 706B and 708B in thermal contact with the environment. The flow though the air venting conduit is affected by a thermal siphon effect. The air flow in the air venting conduit (700A, 700B) is enabled by a chimney effect, whereby relatively cooler air from the environment is drawn into the air venting conduits from first external portion 708B (in the area of circulation input pipe 200B), comes in thermal contact with the internal area of the insulated solar panel where the air increases in temperature, and rises out of air venting conduit via an upper opening from second external portion 706B (in the area of circulation output pipe 470).

In a preferred embodiment, a single upper actuator (actuator 480 in the area of circulation output pipe 470) is used, while a lower actuator (actuator 480 in the area of circulation input pipe 200) is absent and the air venting conduit is open to the atmosphere. When the single upper actuator is closed, air flow is restricted in the air venting conduit, allowing normal operation of the solar thermal collector until a pre-defined temperature has been reached, at which the single upper actuator opens, thereby allowing air to pass through the air venting conduit (700A, 700B).

While the internal temperature of the solar thermal collector remains excessive, actuator(s) 480 can remain open and the air venting sub-system can continue to shed excessive heat from the internal area of the solar thermal collector. When the internal temperature drops to normal operating temperatures, actuators 480 close (passively, or can be closed actively) allowing normal operation of the solar collecting system. The geometry of the air venting conduit (700A, 700B), and operational parameters of the actuators 480 can be chosen to limit the internal temperature of a solar thermal collector as appropriate for a desired use of the solar thermal collector. Depending on the use of the solar thermal collector, based on this description one skilled in the art will be able to select the location, configuration, and connections of the air venting conduit and actuators.

It should be noted that the above-described examples, numbers used, and exemplary calculations are to assist in the description of this embodiment. Inadvertent typographical and mathematical errors should not detract from the utility and basic advantages of the invention.

It will be appreciated that the above descriptions are intended only to serve as examples, and that many other embodiments are possible within the scope of the present invention as defined in the appended claims.

The invention claimed is:

1. An apparatus comprising:
   (a) a solar thermal collector including glass, an absorber and internal insulation; and
   (b) a heat transfer mechanism in the form of a closed loop heat pipe including
      (i) a first section inside said solar thermal collector and on a first side of said internal insulation, and in thermal contact with said absorber;
      (ii) a second section on a second side of said internal insulation, said second side opposite said first side, and said second section in thermal contact with an environment outside of said solar thermal collector; and
   wherein said solar thermal collector is a sealed insulated solar panel including transparent insulation, and
   wherein below a pre-defined temperature of said first side, said heat transfer mechanism maintains said first side and said second side in thermal isolation, and above said pre-defined temperature said heat transfer mechanism is operative to enable transfer of heat from said first side to said second side.

2. The apparatus of claim 1 wherein a configuration of said second section is selected from the group consisting of:
   (a) inside said solar thermal collector,
   (b) outside said solar thermal collector, and (c) in thermal contact with a portion of an outer casing of said solar thermal collector.

3. The apparatus of claim 1 wherein said environment includes a support structure of said solar thermal collector.

4. The apparatus of claim 1 wherein said pre-defined temperature is selected from a group consisting of
(a) in the range of 90 to 120 degrees Celsius (° C.), and
(b) in the range of 120 to 220° C.

5. The apparatus of claim 1 wherein said heat transfer mechanism includes:
(a) internal circulation pipes corresponding to said first section;
(b) outer circulation pipes corresponding to said second section;
(c) a circulation connector pipe connecting said internal circulation pipes to said outer circulation pipes at a second location;
wherein below a pre-defined temperature of a circulating fluid in said internal circulation pipes, said circulating fluid remains in said internal circulation pipes, and above said pre-defined temperature of a circulating fluid said circulating fluid flows from said internal circulation pipes through said outer circulation pipes and via said circulation connector pipe to said internal circulation pipes, thereby transferring heat from said first side to the environment.

6. The apparatus of claim 5 wherein said first location is at a circulation input pipe.

7. The apparatus of claim 5 wherein said second location is at a circulation output pipe.

8. An apparatus comprising:
(a) a sealed insulated solar panel including glass, transparent insulation and including internal circulation pipes in thermal contact with an absorber and on a first side of internal thermal insulation;
(b) siphon circulation pipes in thermal contact with said internal circulation pipes;
(c) outer circulation pipes on a second side of said internal thermal insulation, said second side opposite said first side, and said outer circulation pipes in thermal contact with an environment outside of said sealed insulated solar panel;
(d) an actuator valve connecting said siphon circulation pipes to said outer circulation pipes at a first location; and
(e) a circulation connector pipe connecting said siphon circulation pipes to said outer circulation pipes at a second location;
wherein below a pre-defined temperature of a circulating fluid in said siphon circulation pipes, said actuator valve is closed, and above said pre-defined temperature said actuator valve is open and said circulating fluid flows from said siphon circulation pipes via said circulation connector pipe through said outer circulation pipes and via said actuator valve to said siphon circulation pipes, thereby transferring heat from said first side to the environment.

9. The apparatus of claim 8 wherein said outer circulation pipes are inside said sealed insulated solar panel.

10. The apparatus of claim 8 wherein said outer circulation pipes are outside said sealed insulated solar panel.

11. The apparatus of claim 8 wherein said actuator valve is a passive actuator valve.

12. The apparatus of claim 8 wherein said actuator valve is an active actuator valve.

13. The apparatus of claim 8 wherein said first location is at a circulation input pipe.

14. The apparatus of claim 8 wherein said second location is at a circulation output pipe.

15. An apparatus comprising:
(a) a sealed insulated solar panel including glass, an absorber and transparent thermal insulation; and
(b) an air venting conduit including:
(i) a first section inside said sealed insulated solar panel, on a first side of said thermal insulation, and in thermal contact with said absorber;
(ii) a second section on a second side of said thermal insulation, said second side opposite said first side, and said second section open to an environment outside of said sealed insulated solar panel; and
(iii) an actuator valve connecting said first section to said second section;
wherein below a pre-defined temperature of said first side, said actuator valve is closed and said first section and said second section are substantially thermally isolated, and above said pre-defined temperature said actuator valve is open allowing air to flow from a first area of the environment through said first section and via said actuator valve to said second section, thereby transferring heat from said first side to the environment.

* * * * *